(12) United States Patent
Uchida

(10) Patent No.: US 8,257,849 B2
(45) Date of Patent: Sep. 4, 2012

(54) WINDING ELECTRODE BODY, NONAQUEOUS ELECTROLYTE SECONDARY BATTERY, AND METHOD FOR MANUFACTURING WINDING ELECTRODE BODY

(75) Inventor: Yuji Uchida, Fukushima (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 12/472,772

(22) Filed: May 27, 2009

(65) Prior Publication Data

US 2009/0297929 A1 Dec. 3, 2009

(30) Foreign Application Priority Data

May 29, 2008 (JP) .................................. 2008-140483

(51) Int. Cl.
*H01M 2/18* (2006.01)
(52) U.S. Cl. .......................... 429/94; 429/139; 29/623.1
(58) Field of Classification Search .................... 429/94, 429/139, 247; 29/623.1
See application file for complete search history.

(56) References Cited

U.S. PATENT DOCUMENTS

| | | | | |
|---|---|---|---|---|
| 3,298,871 A | * | 1/1967 | Lecouffe et al. | 429/94 |
| 3,410,726 A | * | 11/1968 | Harviel | 429/94 |
| 4,604,333 A | * | 8/1986 | Ikeda et al. | 429/94 |
| 4,929,519 A | * | 5/1990 | Catotti | 429/94 |
| 5,458,993 A | * | 10/1995 | Terao et al. | 429/94 |
| 5,965,290 A | * | 10/1999 | Shimizu et al. | 429/94 |
| 6,335,114 B1 | * | 1/2002 | Ueshima et al. | 429/94 |
| 6,516,266 B2 | | 2/2003 | Shoji | |
| 6,551,737 B1 | * | 4/2003 | Takee | 429/94 |
| 6,682,853 B2 | | 1/2004 | Kimijima et al. | |
| 2006/0051662 A1 | * | 3/2006 | Kwak et al. | 429/142 |
| 2006/0073380 A1 | * | 4/2006 | Kim et al. | 29/623.1 |
| 2007/0154790 A1 | * | 7/2007 | Jeung et al. | 429/94 |

FOREIGN PATENT DOCUMENTS

| | | |
|---|---|---|
| JP | 1-122574 | 5/1989 |
| JP | 3-190061 | 8/1991 |
| JP | 8-273698 | 10/1996 |
| JP | 11-86877 | 3/1999 |
| JP | 2000-173642 | 6/2000 |
| JP | 2001-126769 | 5/2001 |

(Continued)

OTHER PUBLICATIONS

Japanese Office Action dated Nov. 24, 2010, for corresponding Japanese Appl. No. 2008-140483.

*Primary Examiner* — Helene Klemanski
(74) *Attorney, Agent, or Firm* — K&L Gates LLP

(57) ABSTRACT

A winding electrode body is provided which includes a belt-shaped positive electrode, a belt-shaped negative electrode, and two belt-shaped separators. In the above winding electrode body, the two separators are laminated with the positive electrode and the negative electrode are wound in the state that positive electrode and the negative electrode are interleaved by the intermediate portions of the two separators in the longitudinal directions thereof, start edges of the two separators extending past the intermediate portions are disposed to face each other in a free edge state at a position at which the positive electrode and the negative electrode are not provided, and end edges of the two separators extending past the intermediate positions are disposed and fixed to each other at a position at which the positive electrode and the negative electrode are not provided.

8 Claims, 10 Drawing Sheets

FOREIGN PATENT DOCUMENTS

| | | |
|---|---|---|
| JP | 2001-185220 | 7/2001 |
| JP | 2001-229970 | 8/2001 |
| JP | 2002-208442 | 7/2002 |
| JP | 2002-216853 | 8/2002 |
| JP | 2003-303623 | 10/2003 |
| JP | 2005-129366 | 5/2005 |
| JP | 3937422 | 4/2007 |
| JP | 2007-242519 | 9/2007 |

* cited by examiner

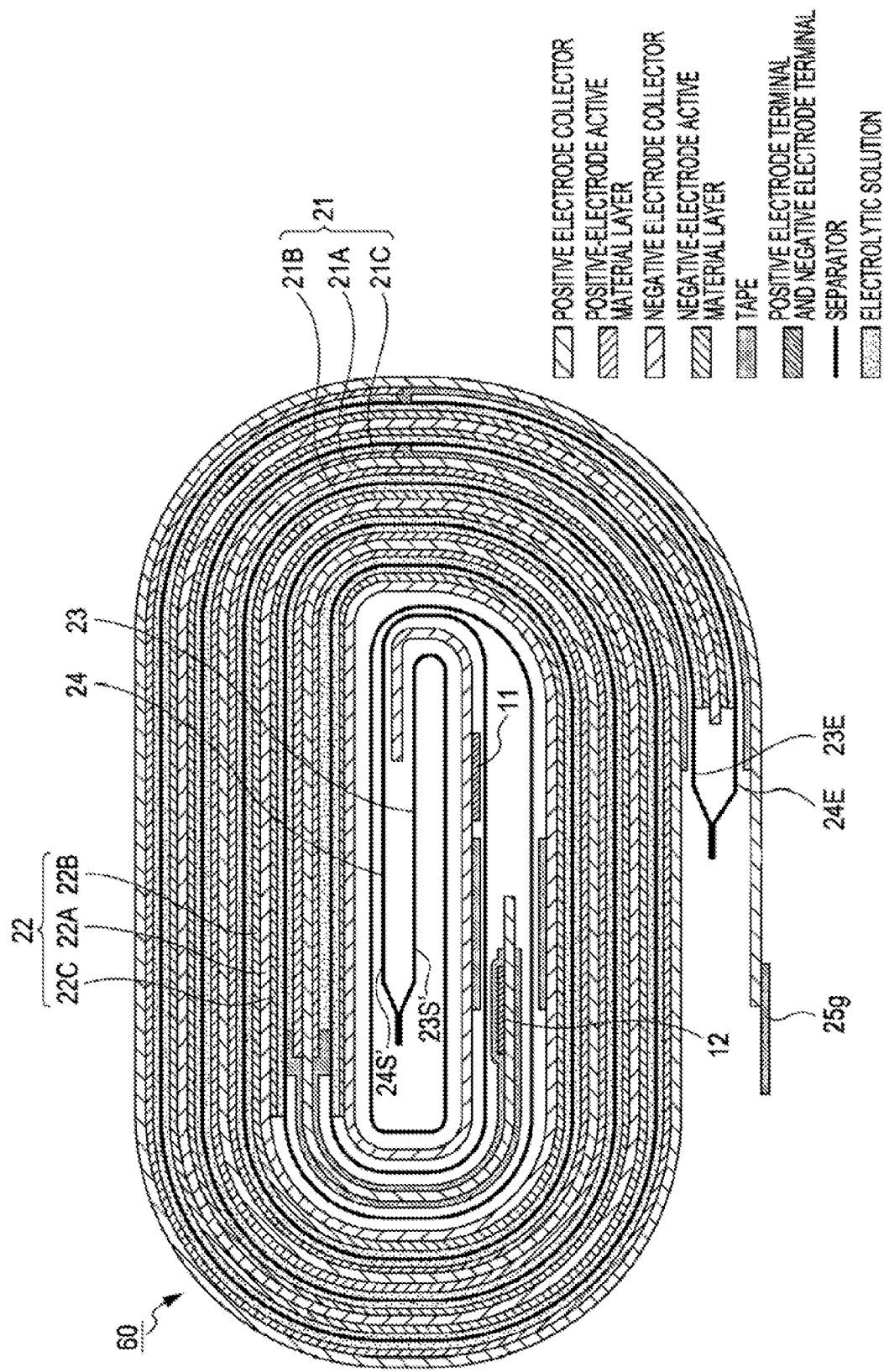

WINDING ELECTRODE BODY, NONAQUEOUS ELECTROLYTE SECONDARY BATTERY, AND METHOD FOR MANUFACTURING WINDING ELECTRODE BODY

CROSS REFERENCES TO RELATED APPLICATIONS

The present application claims priority to Japanese Priority Patent Application JP 2008-140483 filed in the Japan Patent Office on May 29, 2008, the entire content of which is hereby incorporated by reference.

BACKGROUND

The present application relates to a winding electrode body in which a positive electrode and a negative electrode are wound together with separators, a nonaqueous electrolyte secondary battery using the winding electrode body, and a method for manufacturing a winding electrode body.

Heretofore, a large number of portable electronic apparatuses, such as a camera-integrated videotape recorder, a mobile phone, and a portable computer, have been introduced to the market, and the reduction in size and weight of the apparatuses has been pursued. Concomitant with this trend, as portable power sources of electronic apparatuses, batteries, in particular, secondary batteries have been actively developed. Among the secondary batteries, a lithium ion secondary battery has drawn attention as a battery capable of realizing a high energy density.

A lithium ion secondary battery includes an electrode body in which at least one positive electrode and at least one negative electrode are wound or laminated together with separators, a nonaqueous electrolytic solution, and an exterior package including a metal can made of aluminum or the like or an exterior member such as a laminate film, which accommodates the electrode body and the nonaqueous electrolytic solution.

Since the nonaqueous electrolytic solution contains a flammable nonaqueous solvent (such as a carbonate ester-based organic solvent), smoking and/or ignition may dangerously occur due to an external or an internal (such as an internal short circuit) factor; hence, one of important subjects of the secondary battery is to ensure the safety.

For example, in a lithium ion secondary battery, metal lithium used as an active material may be deformed due to charge-discharge cycles of the battery to generate dendrites, and in some cases, these dendrites may form a short circuit bridge to cause an internal short circuit.

In addition, for example, when a lithium ion secondary battery is heated in a heating test or the like, separators may shrink due to the heat, and in some cases, a positive electrode and a negative electrode may be directly brought into contact with each other to cause an internal short circuit. When the internal short circuit occurs, the thermal runaway may be induced as described above, and hence it is not preferable from a safety point of view.

As a technique to avoid an internal short circuit, for example, in order to prevent the generation of dendrites, a cylindrical-type lithium ion secondary battery has been disclosed in which a positive electrode and a negative electrode are wound together with belt-shaped separators each having a width larger than that of each sheet of the above electrodes, end portions of the separators protruding from the top and the bottom (or the right and the left) ends of the two wound electrode sheets in the axial direction thereof are folded in a winding axial direction, and the folded portion of each side is heat-sealed so that the positive electrode and the negative electrode are covered with the separators (see Japanese Unexamined Patent Application Publication No. 1-122574).

In addition, a laminate-type lithium ion secondary battery has also been disclosed which uses a laminate type electrode body in which positive electrodes and negative electrodes are laminated to each other with separators larger than of the two types of electrode sheets interposed therebetween, and in which the two types of electrode sheets are covered by adhering end portions of the separators protruding from each of two sides of the two types of electrodes (see Japanese Unexamined Patent Application Publication No. 2002-208442).

SUMMARY

However, as for a thermal shrinkage rate of separators winding a positive electrode and a negative electrode, in general, since a thermal shrinkage rate in a winding direction (longitudinal direction) of a winding electrode body is generally larger than that in an axial direction thereof, even when the two sides of the separator in the axial direction are each heat-sealed as described above, an internal short circuit may occur in some cases due to the thermal shrinkage.

When the winding electrode body is formed, since winding is performed while a start edge of each separator at an inner circumference side is fixed to a winding shaft, a margin on which the positive electrode and the negative electrode are not provided is requested to have a predetermined length.

On the other hand, each separator at an outer circumference side of the winding electrode body is not necessarily fixed to the winding shaft unlike the case of the separator at the inner circumference side, and in order to decrease a material loss as small as possible, a margin of the separator on which the positive electrode and the negative electrode are not provided is preferably decreased.

In the winding electrode body in which the margins of the separator are formed as described above, in the case in which, as in the above laminate type lithium ion secondary battery, parts of the separators at the outer circumference side are fixed to each other and parts of the separators at the inner circumference side are also fixed to each other, when the separators shrink by heat application, at the end portions of the separators at the outer circumference side in the winding direction (longitudinal direction) at which the length of the margin is short, the separators may roll up the electrodes therein. As a result, the electrodes are bent to break the separators, and one of the front portions of the electrodes is brought into contact with the other adjacent electrode, so that the positive electrode and the negative electrode may be connected to each other to cause an internal short circuit in some cases.

In addition, a related method for manufacturing a winding electrode body of a nonaqueous electrolyte secondary battery has the steps of winding two separators, a positive electrode, and a negative electrode while one separator is provided therebetween; while winding is performed, sequentially cutting the positive electrode, the separators, and the negative electrode at an outer circumference side to form end portions thereof; and fixing the separator to the positive electrode or the negative electrode, whichever closer to the outer circumference side, by an adhesive tape or the like, so that the winding is completed.

In the winding electrode body formed by the manufacturing method as described above, in order to prevent the generation of wrinkles, the two separators thus wound are not fixed to each other by an adhesive tape or the like.

As a result, in a separator having a relatively small thickness or a separator formed of a material which is liable to hold static electricity, an outer circumference-side end portion (end edge) of the separator in the winding direction, which is not fixed by an adhesive tape or the like, is liable to be lifted up, and when the separator is lifted up as described above, the positive electrode and the negative electrode may be directly brought into contact with each other to cause an internal short circuit in some cases.

Accordingly, in consideration of the problems described above, it is preferable to provide a winding electrode body which prevents an internal short circuit caused by heat shrinkage and/or lifting of a separator and which has an improved safety; a nonaqueous electrolyte secondary battery using the above winding electrode body; and a manufacturing method thereof.

Based on research conducted by the inventors, it was found that the winding electrode body described above can be obtained when start edges of two belt-shaped separators are not fixed to each other, and end edges of the above two separators are fixed to each other according to an embodiment.

According to an embodiment, there is provided a winding electrode body which includes: a belt-shaped positive electrode; a belt-shaped negative electrode; and two belt-shaped separators, wherein the two separators are laminated with the positive electrode and the negative electrode are wound in the state that positive electrode and the negative electrode are interleaved by the intermediate portions of the two separators in the longitudinal directions thereof, start edges of the two separators extending past the intermediate portions are disposed to face each other in a free edge state at a position at which the positive electrode and the negative electrode are not provided, and end edges of the two separators extending past the intermediate positions are disposed and fixed to each other at a position at which the positive electrode and the negative electrode are not provided.

According to an embodiment, there is provided a nonaqueous electrolyte secondary battery which includes the above winding electrode body, a nonaqueous electrolytic solution, and an exterior package which accommodates the winding electrode body and the nonaqueous electrolytic solution.

According to an embodiment, there is provided a method for manufacturing a winding electrode body including the steps of: preparing a belt-shaped positive electrode, a belt-shaped negative electrode, and two belt-shaped separators; starting winding of the two separators while being disposed to face each other in a free end state without being provided with the positive electrode and the negative electrode; winding intermediate portions of the two separators in the longitudinal directions thereof together with the positive electrode and the negative electrode in the state that positive electrode and the negative electrode are interleaved by the intermediate portions of the two separators; while the positive electrode or the negative electrode is disposed between the two separators, with end edges of the two separators extending past the positive electrode or the negative electrode inbetween and facing each other; fixing the extending and facing end edges of the separators to each other; and fixing the positive electrode or the negative electrode which extends past the two separators to a portion which is already wound to complete the winding.

According to an embodiment, in the two separators which are wound together with the belt-shaped negative electrode and the belt-shaped positive electrode, the end edges of the wound two belt-shaped separators are fixed to each other while the start edges thereof are not fixed to each other; hence, the winding electrode body which can prevent an internal short circuit caused by heat shrinkage and/or lifting of the separators and which has an improved safety, the nonaqueous electrolyte secondary battery using the above winding electrode body, and the method for manufacturing a winding electrode body can be provide.

Additional features and advantages are described in, and will be apparent from, the following Detailed Description and the figures.

BRIEF DESCRIPTION OF THE FIGURES

FIG. 10 is a schematic cross-sectional view showing a winding electrode body of Comparative Example 3.

DETAILED DESCRIPTION

The present application will be described below in detail with reference to the accompanying drawings according to an embodiment.

Figure 1:
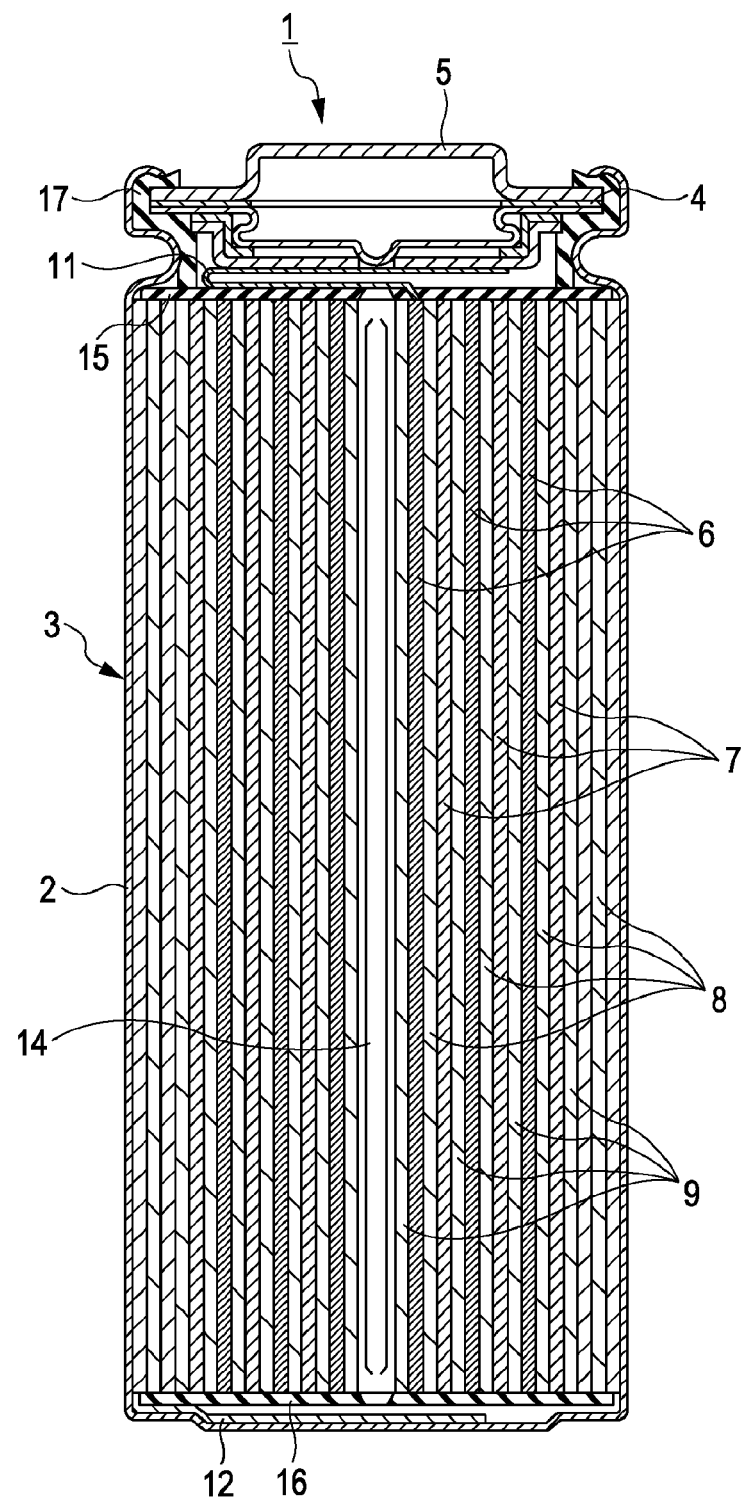
FIG. 1 is a longitudinal cross-sectional view showing a first example of a nonaqueous electrolyte secondary battery according to an embodiment.

FIG. 1 is a longitudinal cross-sectional view showing a first example of a nonaqueous electrolyte secondary battery according to an embodiment. As the nonaqueous electrolyte secondary battery according to an embodiment, for example, a lithium ion secondary battery may be mentioned.

As shown in FIG. 1, a nonaqueous electrolyte secondary battery 1 has a cylindrical battery can 2 which is one example of an exterior package, a winding electrode body 3 accommodated in this battery can 2, a safety valve device 4 which prevents an abnormal increase in pressure inside the battery and overcharge thereof, a terminal plate 5 which seals up an opening portion of the battery can 2, and the like.

With reference to FIG. 1, the structure of the nonaqueous electrolyte secondary battery of the first example will be described in detail.

The winding electrode body 3 accommodated in the battery can 2 has a belt-shaped positive electrode 6, a belt-shaped negative electrode 7, and two separators 8 and 9 which are also each formed to have a belt shape. The separator 8 is provided between the positive electrode 6 and the negative electrode 7, and the other separator 9 is disposed at the side opposite to the separator 8 with respect to the positive electrode 6. A laminate including the four layers as described above is wound while the positive electrode 6 is placed inside, so that the winding electrode body 3 is formed.

The winding electrode body 3 has a positive electrode terminal 11 connected to a positive electrode collector of the positive electrode 6 and a negative electrode terminal 12 connected to a negative electrode collector of the negative electrode 7.

In addition, the positive electrode terminal 11 is formed to extend to a top surface side which is one end of the winding electrode body 3 in an axial direction, and the negative electrode terminal 12 is formed to extend to a bottom surface side which is the other end in the axial direction.

A center pin 14 in the form of a pipe is inserted in a hole located at the central portion of the winding electrode body 3. In addition, an upper insulating member 15 is disposed on the top surface of the winding electrode body 3, and a lower insulating member 16 is disposed on the bottom surface.

Next, a second example of a nonaqueous electrolyte secondary battery according to an embodiment will be described.

Figure 2:
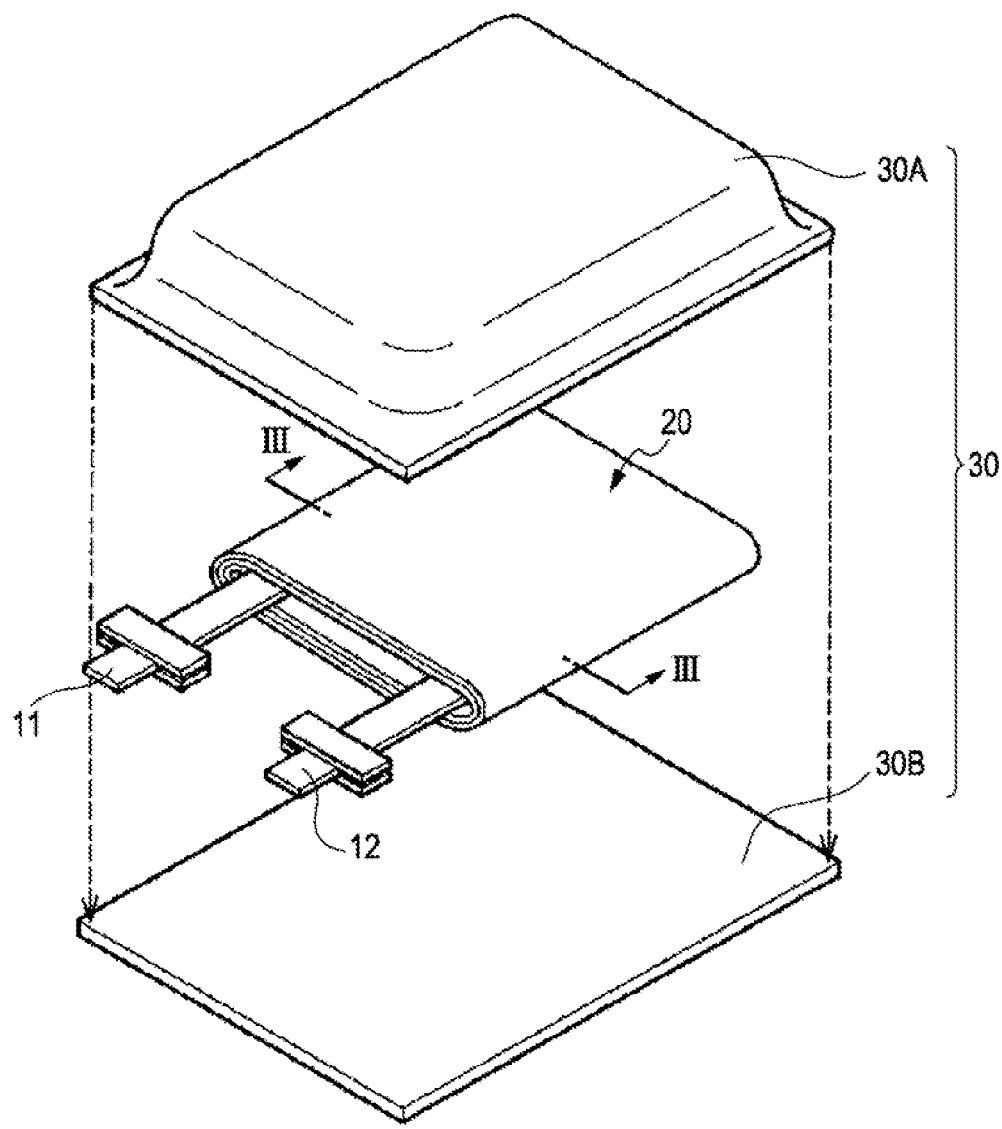
FIG. 2 is an exploded perspective view showing a second example of a nonaqueous electrolyte secondary battery according to an embodiment.

FIG. 2 is an exploded perspective view showing the second example of a nonaqueous electrolyte secondary battery according to a preferable embodiment.

As shown in FIG. 2, the nonaqueous electrolyte secondary battery has the structure in which a winding electrode body 20 including a positive electrode terminal 11 and a negative electrode terminal 12 is enclosed inside an exterior package 30 which uses exterior members 30A and 30B each composed, for example, of a laminate film.

The positive electrode terminal 11 and the negative electrode terminal 12 are formed to extend from the inside to the outside of the exterior package 30, for example, in the same direction.

Next, the winding electrode body 20 used in the nonaqueous electrolyte secondary battery of the first or the second example will be described.

Figure 3:
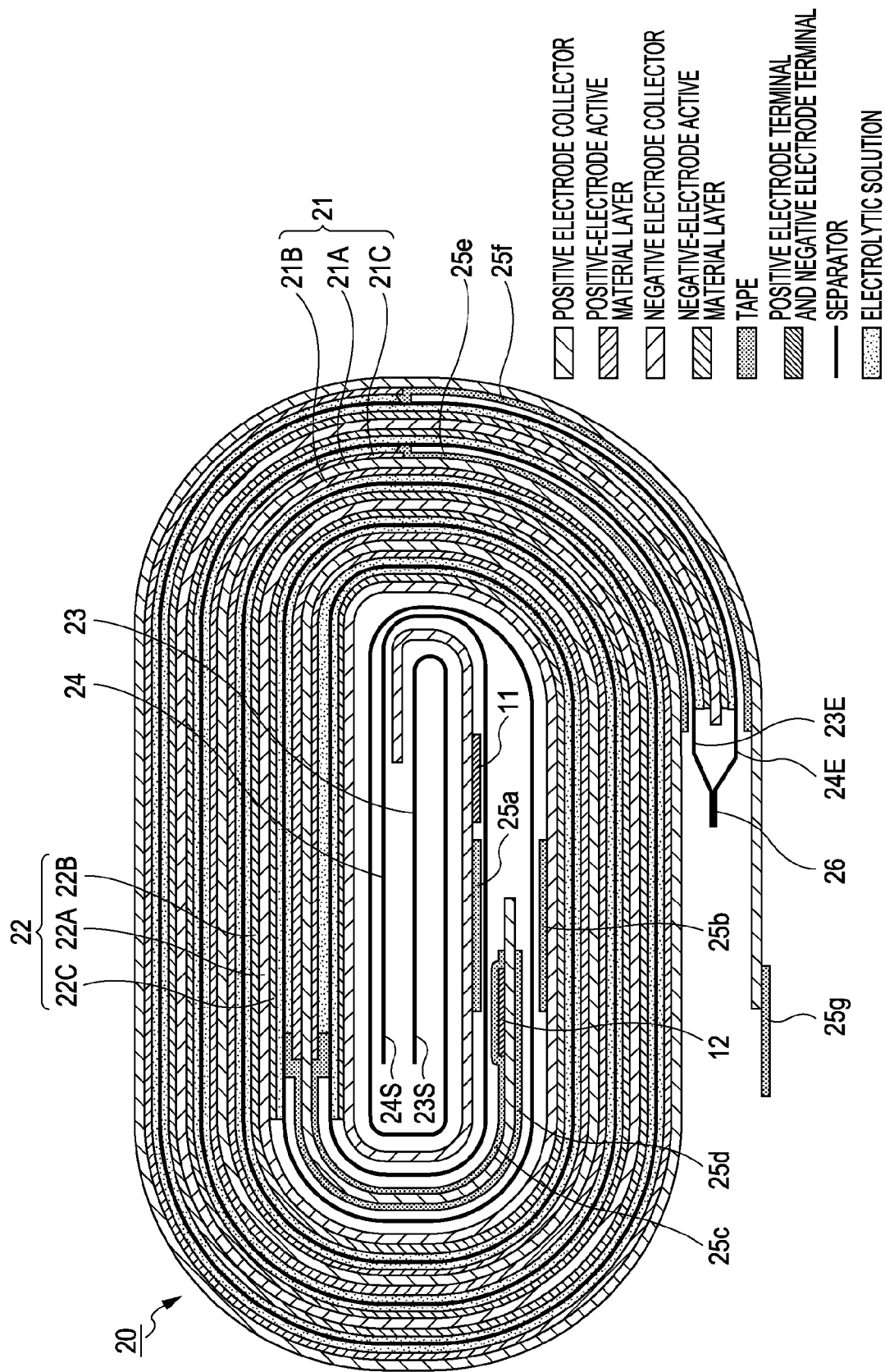
FIG. 3 is a schematic cross-sectional view of a first example of a winding electrode body according to an embodiment, which is taken along the line III-III shown in FIG. 2.

FIG. 3 is a schematic cross-sectional view of a first example of a winding electrode body according to an embodiment, which is taken along the line III-III shown in FIG. 2.

As shown in FIG. 3, the winding electrode body 20 has a belt-shaped positive electrode 21, a belt-shaped negative electrode 22, and two belt-shaped separators 23 and 24.

The winding electrode body 20 shown in FIG. 3 has the structure in which the positive electrode 21 or the negative electrode 22 is disposed between separators 23 and 24, and in which the four layers, that is, the positive electrode 21, the negative electrode 22, and the separators 23 and 24, which are overlapped with each other, are wound around a winding shaft which is not shown in the figure.

In the example shown in FIG. 3, the belt-shaped positive electrode 21 has the structure in which two surfaces of a positive electrode collector 21A are covered with positive-electrode active materials 21B and 21C.

The positive electrode 21 has exposed portions at two ends thereof at which the positive electrode collector 21A are not covered with the positive-electrode active materials 21B and 21C, and the positive electrode terminal 11 is connected to one of the exposed portions (exposed portion disposed at an inner circumference side of the winding electrode body 20).

In addition, the belt-shaped negative electrode 22 has the structure in which two surfaces of a negative electrode collector 22A are covered with negative-electrode active materials 22B and 22C.

The negative electrode 22 has exposed portions at two ends thereof at which the negative electrode collector 22A are not covered with the negative-electrode active materials 22B and 22C, and the negative electrode terminal 12 is connected to one of the exposed portions (exposed portion disposed at the inner circumference side of the winding electrode body 20).

As shown in FIG. 3, at the inner circumference side of the winding electrode body 20, start edges 23S and 24S of the separators 23 and 24 extend linearly and are disposed to face each other in a free edge state without being provided with the positive electrode 21 and the negative electrode 22.

The winding electrode body 20 is fixed at the inner circumference side thereof by winding the start edges 23S and 24S of the separators 23 and 24 around the winding shaft (not shown in the figure). In order to fix the winding electrode body 20, the start edges 23S and 24S of the separators 23 and 24 are each formed to have a long margin which is not provided with the positive electrode 21 and negative electrode 22.

The winding electrode body 20 may be fixed at the inner circumference side thereof in some cases by holding the start edges 23S and 24S of the separators 23 and 24 using a groove formed in the winding shaft (not shown in the figure). Incidentally, the winding shaft is removed when the winding is completed.

In addition, at the inner circumference side of the winding electrode body 20, the negative electrode 22 (negative electrode collector 22A) is disposed between the separators 23 and 24 a predetermined distance apart from the start edges 23S and 24S thereof. After being wound approximately a half turn, this negative electrode 22 (negative electrode collector 22A) is fixed to the separator 24 by a protective tape 25a, and after being wound approximately one and a half turns around the winding shaft, this negative electrode 22 (negative electrode collector 22A) is fixed to the separator 23 by a protective tape 25b.

On the other hand, at the inner circumference side of the winding electrode body 20, the positive electrode 21 (positive electrode collector 21A) is disposed between the separator 23 wound approximately one and a half turns around the winding shaft (not shown in the figure) and the separator 24 wound approximately a half turn around the winding shaft. This positive electrode 21 (positive electrode collector 21A) and the separator 23 are fixed by a protective tape 25d, and this positive electrode 21 (positive electrode collector 21A) and the separator 24 are fixed by a protective tape 25c.

In the winding electrode body 20 of this example, the four layers, that is, the positive electrode 21, the negative electrode 22, and the separators 23 and 24, are overlapped with each other at an intermediate portion (between the star edges and the end edges) of the wound belt-shaped separators 23 and 24 in the longitudinal direction thereof.

A nonaqueous electrolytic solution including an electrolyte is disposed between the positive electrode 21 and the separator, and between the negative electrode 22 and the separator, a nonaqueous electrolytic solution including an electrolyte is also disposed.

At an outer circumference side of the winding electrode body 20, the two separators 23 and 24 extend past an end portion of the negative electrode 22 and are disposed to face each other without being provided with the negative electrode 22 and the positive electrode 21.

The winding electrode body 20 has a fixed portion 26 at the outer circumference side thereof at which two end edges 23E and 24E of the two separators 23 and 24 are fixed together by heat sealing.

Since the end edges 23E and 24E of the separators 23 and 24 are not requested to be fixed to the winding shaft unlike the start edges 23S and 24S, the lengths of the margins thereof which are not provided with the positive electrode 21 and the negative electrode 22 are designed to be short.

At the outer circumference side of the winding electrode body 20, the negative electrode 22 is present within the fixed portion 26 formed of the separators 23 and 24, and the exposed portion (positive electrode collector 21A) of the positive electrode 21 is fixed to the separator 23 by a protective tape 25e and is fixed to the separator 24 by a protective tapes 25f.

In addition, at the outermost circumference side of the winding electrode body 20, the positive electrode 21 extends past the fixed portion 26 formed of the separators 23 and 24 so that the exposed portion (positive electrode collector 21A) of the positive electrode 21 is fixed to a part of the positive electrode 21 (positive electrode collector 21A) which is already wound.

That is, at the outermost circumference side of the winding electrode body 20, the winding electrode body 20 has the structure in which the exposed portion (positive electrode collector 21A) of the positive electrode 21 further extending past the fixed portion 26 is provided, and in which this exposed portion is fixed by a protective tape 25g to a part of the exposed portion (positive electrode collector 21A) of the positive electrode 21 located at the inner circumference side.

In the winding electrode body 20 of this example, since the start edges 23S and 24S of the separators 23 and 24 are disposed to face each other is a free end state, and the end edges 23E and 24E of the separators 23 and 24 are fixed to each other to form the fixed portion 26, for example, when the separators heat-shrink in the winding direction (longitudinal direction) during heating in a heating test or the like, a strain generated by the heat shrinkage of the separators is released form the free edges located at the inner circumference side of the winding electrode body 20. That is, the strain (deformation) generated by heat shrinkage of the separators at the inner circumference side of the winding electrode body 20 is larger than that generated at the outer circumference side thereof.

At the portions of the separators 23 and 24 disposed at the inner circumference side of the winding electrode body 20, since long margins which are not provided with the positive electrode 21 and the negative electrode 22 are formed, even when the separators 23 and 24 heat-shrink, a strain (deformation) rolling up the positive electrode 21 or the negative electrode 22 is not generated.

On the other hand, at the portions of the separators 23 and 24 disposed at the outer circumference side of the winding electrode body 20, since the fixed portion 26 is formed, even when the separators 23 and 24 heat-shrink, the strain (deformation) is not likely to be generated.

In the winding electrode body 20 of this example, even when the separators heat-shrink during heating, the strain (deformation) is not likely to be generated in the separators at the outer circumference side, and at the inner circumference side, the strain (deformation) can be absorbed by the margins; hence, occurrence of an internal short circuit can be suppressed, and the safety of the battery can be improved.

In addition, in the winding electrode body 20 of this example, since the fixed portion 26 formed by fixing the two separators 23 and 24 is provided at the outer circumference side, the strengths of the separators at this portion are increased, and hence the separators 23 and 24 are prevented from lifting caused by static electricity or the like; hence, an internal short circuit which may occurs when the separators are lifted up can be suppressed from being generated.

Next, one example of a manufacturing method of the winding electrode body 20 shown in FIG. 3 will be described.

The belt-shaped positive electrode 21, the belt-shaped negative electrode 22, and the two belt-shaped separators 23 and 24 are prepared.

In a winding-start step, the two separators 23 and 24 are disposed to face each other without being provided with the positive electrode 21 and the negative electrode 22, and the start edges 23S and 24S of the two separators 23 and 24, which are disposed to face each other, are wound in a free edge state around the winding shaft (not shown in the figure) so as to fix the two separators 23 and 24.

Alternatively, the start edges 23S and 24S of the two separators 23 and 24 may be held in a groove formed in the winding shaft (not shown in the figure) so as to fix the separators 23 and 24.

Subsequently, in a winding step, after the negative electrode 22 is first disposed between the separators 23 and 24 and is then wound approximately a half turn, the positive electrode 21 is disposed between the two separators 23 and 24, and the four layers, that is, the positive electrode 21, the negative electrode 22, and the two separators 23 and 24, overlapped with each other are wound.

Next, in a fixing step, after the negative electrode 22 disposed between the separators 23 and 24 is cut off so that the end edges 23E and 24E of the separators 23 and 24 extend past the end portion of the negative electrode 22 and face each other, the end edges 23E and 24E are simultaneously processed by thermal cutting and are heat-sealed therebetween, thereby forming the fixed portion 26.

Subsequently, in a winding-end step, an end portion of the positive electrode 21 which extends past the fixed portion 26 of the separators 23 and 24 is fixed by the protective tape 25g to a part of the positive electrode 21 which is already wound, thereby completing the winding.

In this embodiment, the number of turns wound around the winding shaft is not limited to that shown in this example, the method for forming the fixed portion 26 is not limited to the thermal cutting described in this example, and for example, after the separators 23 and 24 are cut off by a pair of scissors, the end edges 23E and 24E may be heat-sealed together.

Next, other examples (second to fifth examples) of a winding electrode body according to a preferable embodiment will be described.

In the second to fourth examples, since only the form of the fixed portion at which the end edges of the separators are fixed together is different from that of the winding electrode body of the first example shown in FIG. 3, only different points will be described.

In addition, in the fifth example, since only the form of the outermost circumference end portion of the winding electrode body is different from that of the winding electrode body of the first example shown in FIG. 3, only different points will be described.

Figure 4:
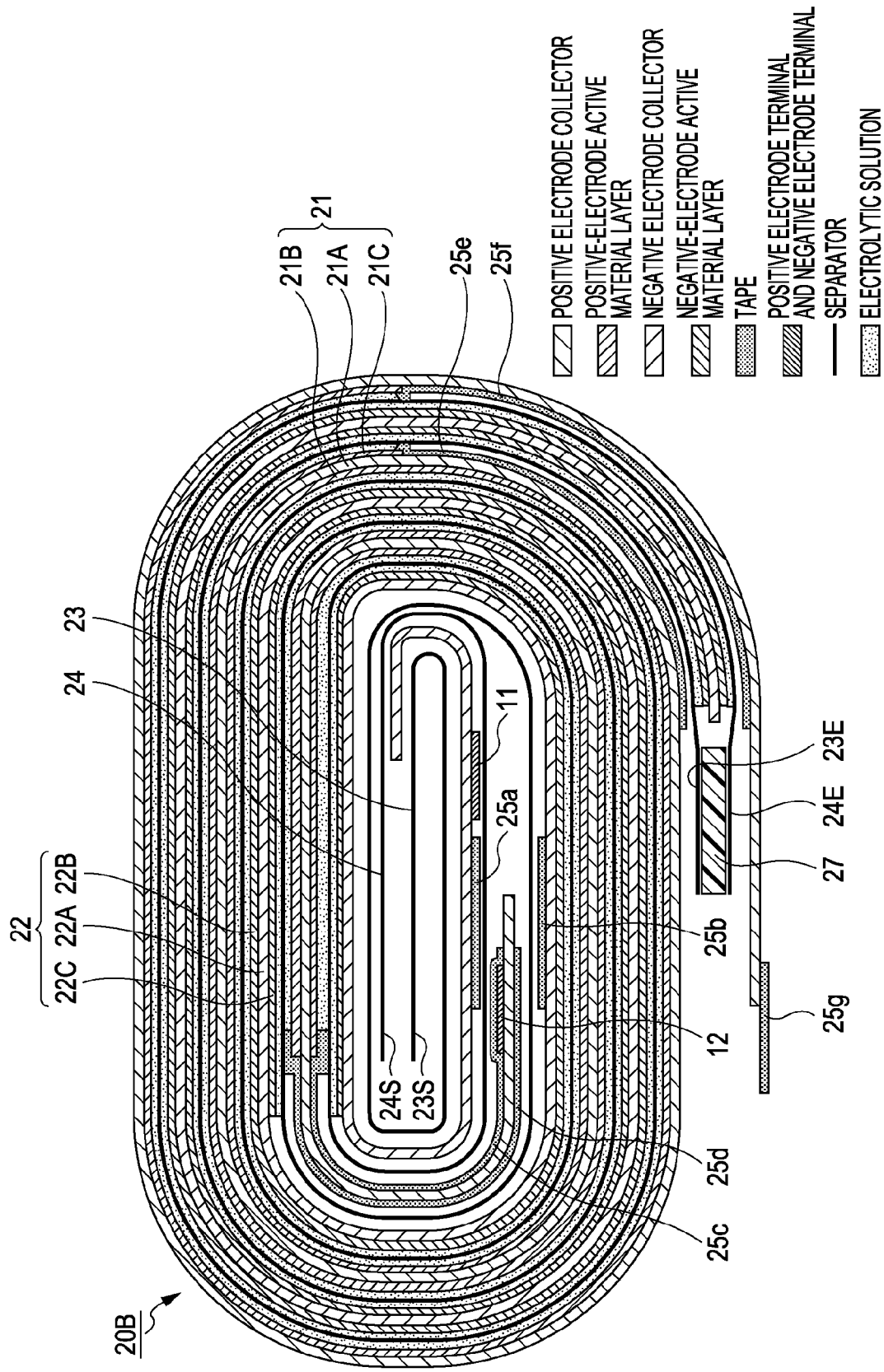
FIG. 4 is a schematic cross-sectional view showing a second example of a winding electrode body according to an embodiment.

FIG. 4 is a schematic cross-sectional view showing the second example of the winding electrode body according to the embodiment. In FIG. 4, constituent elements similar to those of the winding electrode body 20 shown in FIG. 3 are designated by the same reference numerals.

A winding electrode body 20B has a fixed portion 27 at an outer circumference side thereof which is formed by fixing the end edges 23E and 24E of the two separators 23 and 24 using an adhesive.

As the adhesive, for example, an isocyanate, an acryl, an epoxy, a silicone, an α-olefin, a nitrile rubber, or a chloroprene adhesive may be used.

In a fixing step in manufacturing the winding electrode body 20B, the negative electrode 22 disposed between the separators 23 and 24 is cut off so that the end edges 23E and 24E thereof extend past the end portion of the negative electrode 22 and are disposed to face each other. After an isocyanate adhesive or the like is applied between the end edges 23E and 24E which are disposed to face each other, the end edges 23E and 24E are fixed to each other, so that the fixed portion 27 is formed.

Figure 5:
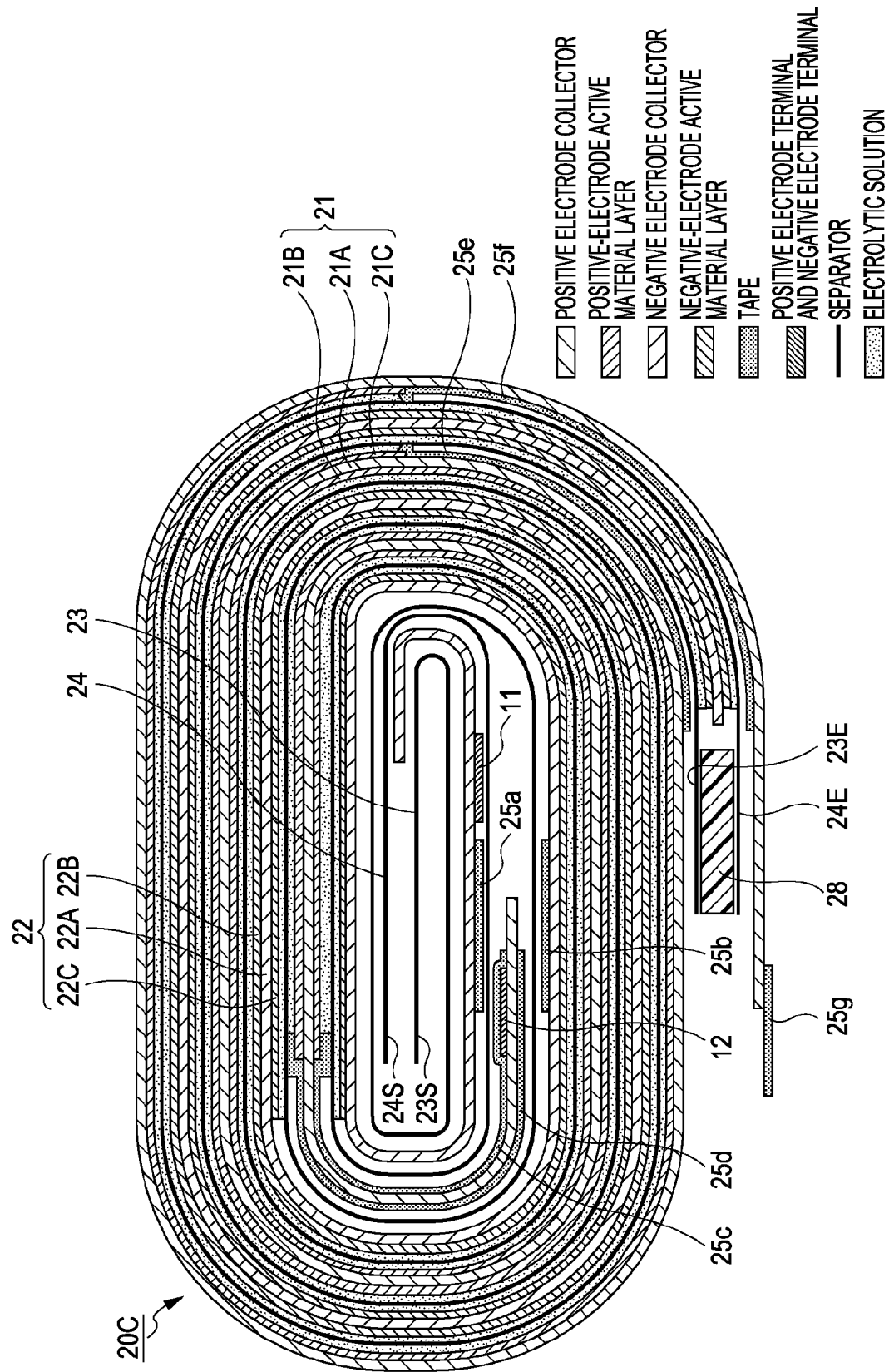
FIG. 5 is a schematic cross-sectional view showing a third example of a winding electrode body according to an embodiment.

FIG. 5 is a schematic cross-sectional view showing the third example of the winding electrode body according to the embodiment. In FIG. 5, constituent elements similar to those of the winding electrode body 20 shown in FIG. 3 are designated by the same reference numerals.

A winding electrode body 20C has a fixed portion 28 at an outer circumference side thereof which is formed by fixing the end edges 23E and 24E of the separators 23 and 24 using a two-sided adhesive tape provided between the end edges 23E and 24E thereof.

As the two-sided adhesive tape, for example, an adhesive tape may be used which includes a base material (tape) made of a polyimide resin having a thickness of 12 to 50 µm and an adhesive, such as a silicon or an acrylic adhesive, applied to two surfaces of the base material.

In addition, a two-sided adhesive tape may also be used which includes a base material made of a poly(ethylene terephthalate) (PET) or polypropylene (PP) and an adhesive, such as a silicon or an acrylic adhesive, applied to two surfaces of the base material.

In a fixing step in manufacturing the winding electrode body 20C, the negative electrode 22 disposed between the separators 23 and 24 is cut off so that the end edges 23E and 24E thereof extend past the end portion of the negative electrode 22 and are disposed to face each other. After a two-sided adhesive tape is provided between the end edges 23E and 24E which are disposed to face each other, the end edges 23E and 24E are fixed to each other with the two-sided adhesive tape, so that the fixed portion 28 is formed.

Figure 6:
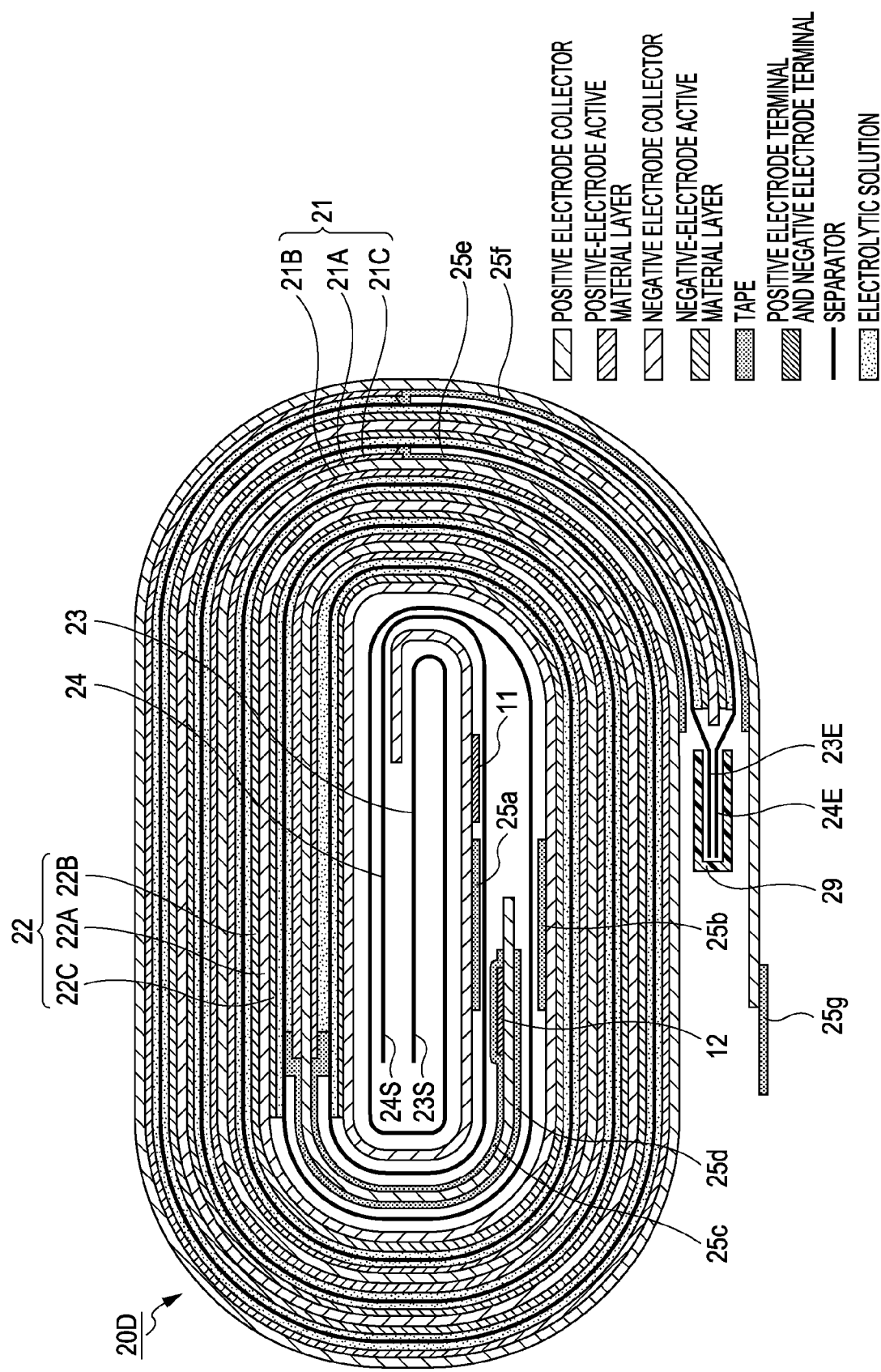
FIG. 6 is a schematic cross-sectional view showing a fourth example of a winding electrode body according to an embodiment.

FIG. 6 is a schematic cross-sectional view showing the fourth example of the winding electrode body according to the embodiment. In FIG. 6, constituent elements similar to those of the winding electrode body 20 shown in FIG. 3 are designated by the same reference numerals.

A winding electrode body 20D has a fixed portion 29 at an outer circumference side thereof which is formed by fixing the end edges 23E and 24E of the separators 23 and 24 using an adhesive tape.

As the adhesive tape, for example, an adhesive tape may be used which includes a base material (tape) made of a polyimide resin having a thickness of 12 to 50 µm and an adhesive, such as a silicon or an acrylic adhesive, applied to one surface of the base material.

In addition, an adhesive tape may also be used which includes a base material made of poly(ethylene terephthalate) (PET) or polypropylene (PP) and an adhesive, such as a silicon or an acrylic adhesive, applied to the base material.

In a fixing step in manufacturing the winding electrode body 20D, the negative electrode 22 disposed between the separators 23 and 24 is cut off so that the end edges 23E and 24E thereof extend past the end portion of the negative electrode 22 and are disposed to face each other. After the end edges 23E and 24E which are disposed to face each other are overlapped with each other, an adhesive tape is provided along the peripheries of the end edges 23E and 24E, and the end edges 23E and 24E are fixed to each other to form the fixed portion 29.

Figure 7:
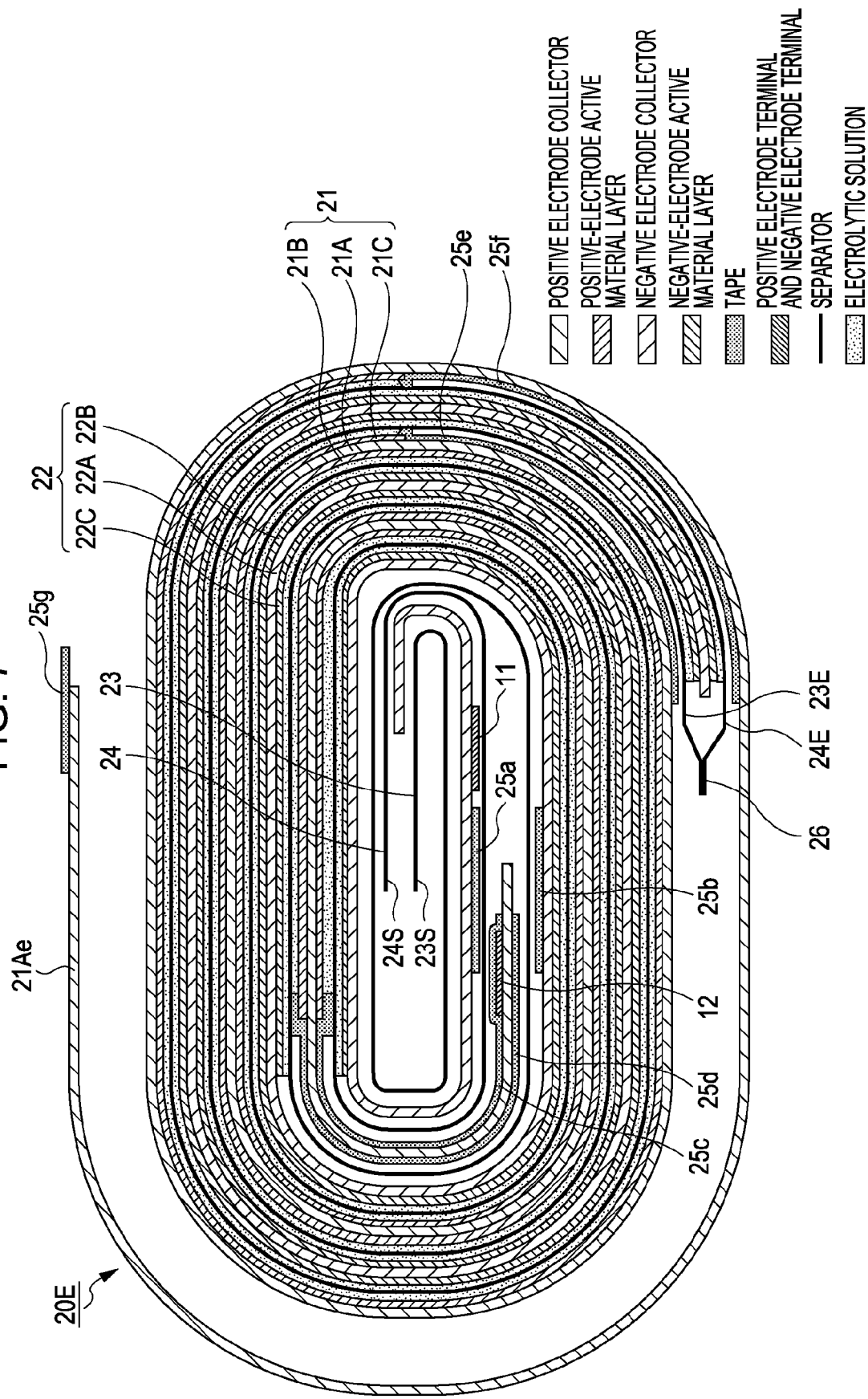
FIG. 7 is a schematic cross-sectional view showing a fifth example of a winding electrode body according to an embodiment.

FIG. 7 is a schematic cross-sectional view showing the fifth example of the winding electrode body according to the embodiment. In FIG. 7, constituent elements similar to those of the winding electrode body 20 shown in FIG. 3 are designated by the same reference numerals.

A winding electrode body 20E shown in FIG. 7 has the structure in which an exposed portion (positive electrode collector 21Ae) of the positive electrode 21 extends a half turn or more along the outermost circumference past the fixed portion 26, and this exposed portion is fixed by the protective tape 25g to a part of the positive electrode 21 (positive electrode collector 21Ae) which is already wound and is located at an inner circumference side.

In this winding electrode body 20E of this example, the fixed portion thereof may be formed by fixing the end edges 23E and 24E of the separators 23 and 24 by heat-sealing or by using a two-sided adhesive tape or an adhesive tape.

In a winding-end step in manufacturing the winding electrode body 20E, the exposed portion (positive electrode collector 21Ae) of the positive electrode 21 extending past the fixed portion 26 is further wound approximately a half turn, and an end portion of the exposed portion (positive electrode collector 21Ae) of the positive electrode 21 is then fixed by the protective tape 25g to a part of the positive electrode 21 which is already wound, thereby completing the winding.

As described above, since the winding electrode body 20E has the exposed portion (positive electrode collector 21Ae) of the positive electrode 21 extending approximately a half turn past the fixed portion 26 at the outermost circumference side, when this exposed portion (positive electrode collector 21Ae) is wound, a tension is applied to the separators 23 and 24, so that lifting thereof can be prevented which is liable to occur at the end edges 23E and 24E of the separators.

Next, constituent elements of the nonaqueous electrolyte secondary battery shown in FIGS. 1 and 2 will be described in detail.

[Positive Electrode]

The positive electrode has the structure in which, for example, at least one surface of a positive electrode collector having a pair of surfaces facing each other is covered with a positive-electrode active material layer.

The positive electrode collector is formed, for example, of a metal foil, such as an aluminum foil, a nickel foil, or a stainless-steel foil.

The positive-electrode active material layer contains at least one type of positive electrode material capable of occluding and releasing lithium as a positive-electrode active material and may also contain, whenever necessary, a conductive material and a bonding agent.

As the positive electrode material capable of occluding and releasing lithium, for example, there may be mentioned chalcogen compounds containing no lithium (particularly, layered compounds and spinel compounds) such as sulfur (S), iron disulfide ($FeS_2$), titanium disulfide ($TiS_2$), molybdenum disulfide ($MoS_2$), niobium selenide ($NbSe_2$), vanadium oxide ($V_2O_5$), titanium dioxide ($TiO_2$), and manganese dioxide ($MnO_2$); lithium-containing compounds; and conductive polymer compounds such as polyaniline, polythiophene, polyacetylene and polypyrrole.

Among those mentioned above, some lithium-containing compound is preferable since a high voltage and a high energy density can be obtained. As the lithium-containing compound described above, for example, a composite oxide containing lithium and a transition metal element and a phosphate compound containing lithium and a transition metal element may be mentioned; however, in order to obtain a high voltage, in particular, a compound containing cobalt (Co), nickel (Ni), manganese (Mn), iron (Fe), copper (Cu), zinc (Zn), chromium (Cr), vanadium (V), titanium (Ti) or an arbitrary mixture thereof is preferable.

The lithium-containing compounds described above may be represented by the following two formulas (1) and (2).

$$*Li_xM^IO_2 \qquad (1)$$

$$*Li_yM^{II}PO_4 \qquad (2)$$

In the above formulas, $M^I$ and $M^{II}$ each indicate at least one type of transition metal element, and although x and y values are dependent on the charge and discharge state of a battery, in general, $0.05 \leq x \leq 1.10$ and $0.05 \leq y \leq 1.10$ hold. The compound represented by the formula (I) generally has a layered structure, and the compound represented by the formula (II) generally has an olivine structure.

As particular examples of the composite oxide containing lithium and a transition metal element, for example, a lithium-cobalt composite oxide ($Li_xCoO_2$), a lithium-nickel composite oxide ($Li_xNiO_2$), a lithium-nickel-cobalt composite oxide ($Li_xNi_{1-z}Co_zO_2$ ($0<z<1$)), and a lithium-manganese composite oxide ($LiMn_2O_4$) having a spinel structure may be mentioned.

Furthermore, as particular examples of the phosphate compound containing lithium and a transition metal element, for example, a lithium-iron-phosphoric acid compound ($LiFePO_4$) having an olivine structure and a lithium-iron-manganese-phosphoric acid compound ($LiFe_{1-v}Mn_vPO_4$ ($v<1$)) may be mentioned.

In the composite oxides described above, for example, in order to stabilize the structure, a compound in which the transition metal is partly replaced with Al, Mg, and/or another transition metal element, a compound in which Al, Mg, and/or another transition metal element is contained in crystalline grain boundaries, and a compound in which oxygen is partly replaced with fluorine or the like may also be mentioned. Furthermore, the surface of the positive-electrode active material may be partly covered with another positive-electrode active material. In addition, the positive-electrode active material may be formed by mixing a plurality of types of materials.

[Negative Electrode]

As in the case of the positive electrode, the negative electrode has the structure in which, for example, at least one surface of a positive electrode collector having a pair of surfaces facing each other is provided with a negative-electrode active material layer.

The negative electrode collector is formed, for example, of a metal foil, such as a copper foil, a nickel foil, or a stainless-steel foil.

The negative-electrode active material layer contains, as a negative-electrode active material, at least one of metal lithium and a negative electrode material capable of occluding and releasing lithium and may also contain, whenever necessary, a conductive material and a bonding agent.

As the negative electrode material capable of occluding and releasing lithium, for example, a carbon material, a metal oxide, and a polymer compound may be mentioned. As the carbon material, a non-graphitizable carbon material, an artificial graphite material, and a graphite material may be mentioned, and more particularly, a pyrolytic carbon, a coke, a graphite, a glassy carbon, a fired organic-polymer compound, a carbon fiber, an activated carbon, and a carbon black may be mentioned.

As the coke, pitch coke, needle coke, and petroleum coke may be mentioned by way of example, and the fired organic-polymer compound indicates a carbonized material obtained by firing a polymer material, such as a phenol resin or a furan resin, at an appropriate temperature. As the metal oxide, for example, an iron oxide, a ruthenium oxide, and a molybdenum oxide may be mentioned, and as the polymer compound, for example, polyacetylene or polypyrrole may be mentioned.

In addition, as the negative electrode material capable of occluding and releasing lithium, a material containing at least one of a metal element and a half metal element, which can form an alloy with lithium, as a constituent element may also be mentioned. This negative electrode material may be a single element, an alloy, or a compound of a metal element or a half metal element, and may be a material at least partly containing at least one phase of those described above.

Furthermore, as the alloy, besides an alloy containing at least two types of metal elements, an alloy containing at least one metal element and at least one half metal element may also be included. In addition, an alloy containing a non-metal element may also be included. Some alloy may have a solid solution structure, an eutectic crystal (eutectic mixture) structure, an intermetallic compound structure, or a structure including at least two of the above structures.

As the metal elements and the half metal elements described above, for example, there may be mentioned tin (Sn), lead (Pb), aluminum (Al), indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Among those mentioned above, a metal element and a half metal element of Group XIV of the long periodic table are preferable, and in particular, silicon and tin are preferable. The reason for this is that since silicon and tin have a high ability of occluding and releasing lithium, a high energy density can be obtained.

In the tin alloy, as a second constituent element other than tin, for example, at least one of silicon, magnesium (Mg), nickel, copper, iron, cobalt, manganese, zinc, indium, silver, titanium (Ti), germanium, bismuth, antimony, and chromium (Cr) may be mentioned.

In the silicon alloy, as a second constituent element other than silicon, for example, at least one of tin, magnesium, nickel, copper, iron, cobalt, manganese, zinc, indium, silver, titanium, germanium, bismuth, antimony, and chromium may be mentioned.

As the tin compound and the silicon compound, for example, a compound containing oxygen (O) or carbon (C) may be mentioned, and the above second constituent element may also be contained as well as tin and silicon.

In addition, as the negative electrode material described above, for example, an element, such as titanium, forming a composite oxide with lithium may also be used. Of course, precipitation and dissolution of metallic lithium may be well performed, and in addition, precipitation and dissolution of magnesium and aluminum other than lithium may also be performed.

[Separator]

In addition, the separator is formed of an insulating thin film having high ion permeability and a predetermined mechanical strength, such as a porous film of a synthetic polyolefin resin including polypropylene or polyethylene, or a porous film of an inorganic material including a non-woven ceramic cloth, and the separator may also have at least two of the above porous films laminated to each other. In particular, a separator including a porous polyolefin film is preferable since it has superior properties of separating a positive electrode from a negative electrode and further suppresses the occurrence of an internal short circuit and a decrease in open-circuit voltage.

In addition, the separator may also include a high molecular weight supporting layer which has ion conductivity and which can retain a nonaqueous electrolytic solution.

[Nonaqueous Electrolytic Solution]

As the nonaqueous electrolytic solution, any electrolytic solution containing an electrolyte salt and a nonaqueous solvent may be used.

In this embodiment, as the electrolyte salt, any salt may be used which generates ions when it is dissolved or dispersed in a nonaqueous solvent described below, and lithium hexafluoro phosphate ($LiPF_6$) is preferably used; however, the electrolyte salt is not limited thereto. That is, for example, there may be used inorganic lithium salts, such as lithium tetrafluoro borate ($LiBF_4$), lithium hexafluoro arsenate ($LiAsF_6$), lithium hexafluoro antimonate ($LiSbF_6$), lithium perchlorate ($LiClO_4$), and lithium tetrachloro aluminate ($LiAlCl_4$); and lithium salts of perfluoroalkane sulfonic acid derivatives, such as trifluoromethane lithium sulfonate ($LiCF_3SO_3$), lithium bis(trifluoromethane sulfone)imide ($LiN(CF_3SO_2)_2$), lithium bis(pentafluoroethane sulfone)imide ($LiN(C_2F_5SO_2)_2$), and lithium tris(trifluoromethane sulfone)methide ($LiC(CF_3SO_2)_3$), and the compounds mentioned above may be used alone or in combination.

In addition, the content of the electrolyte salt as mentioned above is preferably in the range of 0.1 to 3.0 moles with respect to 1 liter of a solvent and more preferably in the range of 0.5 to 2.0 moles. The reason for this is that in the range described above, a higher ion conductivity can be obtained.

In addition, as the nonaqueous solvent, various high dielectric constant solvents and low viscosity solvents may be mentioned.

As the high dielectric constant solvent, for example, ethylene carbonate and propylene carbonate are preferably used; however, the solvent is not limited thereto, and for example, cyclic carbonates, such as butylene carbonate, vinylene carbonate, 4-fluoro-1,3-dioxolane-2-one (fluoroethylene carbonate), 4-chloro-1,3-dioxolane-2-one (chloroethylene carbonate), and trifluoromethyl ethylene carbonate, may also be used.

As the high dielectric constant solvent, for example, lactones, such as γ-butyrolactone and γ-valerolactone; lactams, such as N-methyl pyrrolidone; cyclic carbamic acid esters, such as N-methyl oxazolidinone; and sulfone compounds, such as tetramethylene sulfone, may also be used instead of a cyclic carbonate or may be used in combination therewith.

In addition, as the low viscosity solvent, diethyl carbonate may be preferably used; however, besides diethyl carbonate, there may also be used chain carbonates, such as dimethyl carbonate, ethyl methyl carbonate, and methyl propyl carbonate; chain carboxylic acid esters, such as methyl acetate, ethyl acetate, methyl propionate, ethyl propionate, methyl butylate, methyl isobutylate, methyl trimethyl acetate, and ethyl trimethyl acetate; chain amides such as N,N-dimethyl acetoamide; chain carbamic acid esters, such as methyl N,N-diethyl carbamate and ethyl N,N-diethyl carbamate; and ethers, such as 1,2-dimethoxy ethane, tetrahydrofuran, tetrahydropyran, and 1,3-dioxolane.

As a nonaqueous electrolytic solution used for a nonaqueous electrolyte secondary battery according to an embodiment, although the above high dielectric constant solvents and low viscosity solvents may be used alone or in combination at an arbitrary mixing ratio, a solvent containing 20% to 50% of a cyclic carbonate and 50% to 80% of a low viscosity solvent (low viscosity nonaqueous solvent) is preferably used, and in particular, as the low viscosity solvent, a chain carbonate having a boiling point of 130° C. or less is preferably used.

By using the nonaqueous electrolytic solution as described above, leak prevention of the battery and high conductivity can be simultaneously achieved with a small amount of the nonaqueous electrolytic solution.

When the ratio of the cyclic carbonate to the low viscosity solvent is out of the range described above, the conductivity of the electrolytic solution may be decreased, and the cycle characteristics may be degraded in some cases.

As the chain carbonate having a boiling point of 130° C. or less, dimethyl carbonate, ethyl methyl carbonate, and diethyl carbonate may be mentioned by way of example.

In addition, in the nonaqueous electrolytic solution, a halogenated cyclic carbonate ester derivative is more preferably contained as the above cyclic carbonate since the cycle characteristics are improved.

As the cyclic carbonate ester derivative, 4-fluoro-1,3-dioxolane-2-one and 4-chloro-1,3-dioxolane-2-one, may be mentioned by way of example. These mentioned above may be used alone or in combination. The content thereof is preferably in the range of 0.5% to 2%. The reasons for this are that when the content is small, the effect of improving cycle characteristics is small, and on the contrary, when the content is excessively large, swelling during high-temperature storage is increased.

[Positive Electrode Terminal and Negative Electrode Terminal]

The positive electrode terminal and the negative electrode terminal are each formed, for example, of a metal material, such as aluminum (Al), nickel (Ni), or stainless steel.

[Exterior Package: Battery Can]

Next, the battery can which forms the nonaqueous electrolyte secondary battery shown in FIG. 1 will be described.

The battery can is preferably formed as a hollow cylinder with a bottom using a metal, such as iron (Fe), having conductivity.

The battery can is provided with a terminal portion at the bottom thereof, the central part of the terminal portion is slightly expanded in a circular shape toward the outside.

The battery can is preferably formed to improve the conductivity thereof, for example, by performing nickel plating or applying a conductive paint on the inner surface of the battery can.

In addition, the battery can is preferably protected such that, for example, the outer circumference surface is covered with an exterior label made of a plastic sheet, paper, or the like or is coated with an insulating paint.

[Exterior Package: Exterior Member]

Next, the exterior member which forms the nonaqueous electrolyte secondary battery shown in FIG. 2 will be described.

The exterior member is formed, for example, of a rectangular laminate film including a nylon film, an aluminum foil, and a polyethylene film laminated in this order.

Instead of the above laminate film, the exterior member may be formed, for example, of a laminate film including no metal material, a polymer film, such as a polypropylene film, or a metal film.

The general structure of the exterior member can be represented by a laminate structure of an exterior layer/metal foil/sealant layer (however, the exterior layer and/or the sealant layer may be formed of a plurality of layers in some cases), and in the example described above, the nylon film corresponds to the exterior layer, the aluminum foil corresponds to the metal foil, and the polyethylene film corresponds to the sealant layer.

In addition, as the metal foil, any foil functioning as a barrier film against moisture permeation may be satisfactorily used, and for example, a stainless steel foil, a nickel foil, and a plated iron foil may also be used as well as an aluminum foil; however, an aluminum foil, which has a small thickness, light weight, and superior workability, can be preferably used.

As the exterior member, a usable structure will be represented by (exterior layer/metal foil/sealant layer). As the usable structures, for example, there may be mentioned Ny(nylon)/Al(aluminum)/CPP(non-stretched polypropylene), PET(poly(ethylene terephthalate))/Al/CPP, PET/Al/PET/CPP, PET/Ny/Al/CPP, PET/Ny/Al/Ny/CPP, PET/Ny/Al/Ny/PE(polyethylene), Ny/PE/Al/LLDPE(linear low density polyethylene), PET/PE/Al/PET/LDPE(low density polyethylene), and PET/Ny/Al/LDPE/CPP.

Next, methods for manufacturing the nonaqueous electrolyte secondary batteries of the first and second examples will be described.

MANUFACTURING OF BATTERY

First Example

The nonaqueous electrolyte secondary battery shown in FIG. 1 can be formed, for example, by the following method.

First, after the center pin 14 is inserted into the central hole of the winding electrode body 3, and the insulating members 15 and 16 are disposed on the top and the bottom thereof, the assembly thus formed is placed in the battery can 2.

Next, the negative electrode terminal 12 is welded to an inner surface of the terminal portion of the battery can 2, and the positive electrode terminal 11 is welded to the safety valve device 4.

Subsequently, the nonaqueous electrolytic solution is supplied into the battery can 2.

The safety valve device 4 and the terminal plate 5 are then fitted to a sealing gasket 17, the surface of which is coated with asphalt, and the opening portion of the battery can 2 is sealed thereby.

Next, the opening portion of the battery can 2 is caulked so as to fix the safety valve device 4 and the terminal plate 5 with the sealing gasket 17. Accordingly, the nonaqueous electrolyte secondary battery 1 having a cylindrical exterior shape can be manufactured.

MANUFACTURING OF BATTERY

Second Example

The nonaqueous electrolyte secondary battery shown in FIG. 2 can be formed, for example, by the following method.

First, after the winding electrode body 20 is placed in a recess of the exterior member 30a having a bathtub-shaped recess, a peripheral surface of the recess of this exterior member 30A and one surface of the rectangular exterior member 30B are disposed to face each other, and the peripheral edge portions except for one side among the rectangular four sides are heat-sealed to form a bag shape.

Subsequently, the nonaqueous electrolytic solution is supplied into the bag formed of the exterior members 30A and 30B.

Next, an opening portion of the bag formed of the exterior members 30A and 30B is heat-sealed, so that the winding electrode body 20 and the nonaqueous electrolytic solution are enclosed. Accordingly, the nonaqueous electrolyte secondary battery using the exterior members as the exterior package can be manufactured.

EXAMPLES

Hereinafter, although the present application will be described in more detail using the examples and comparative examples with reference to the accompanying drawings, the present application is not limited thereto.

Example 1

<Formation of Positive Electrode>

First, cobalt carbonate ($CoCO_3$) and lithium carbonate ($LiCO_3$) at a ratio of 1 mole to 0.5 moles were mixed together and were then fired in air at 900° C. for 5 hours, so that a lithium cobalt composite oxide ($LiCoO_2$) was obtained as a positive-electrode active material.

Next, 85 parts by mass of the lithium cobalt composite oxide thus obtained, 5 parts by mass of graphite functioning as a conductive agent, and 10 parts by mass of poly(vinylidene fluoride) functioning as a bonding agent were uniformly mixed together to form a positive electrode mixture, and the mixture was further dispersed in N-methyl-2-pyrrolidone functioning as a dispersion medium, so that a positive electrode mixture slurry was obtained.

Subsequently, the positive electrode mixture slurry thus obtained was applied to at least one of two surfaces of a positive electrode collector made of an aluminum foil having a thickness of 20 μm, followed by performing drying and compression molding by a roll press machine to form a positive-electrode active material layer, thereby forming a positive electrode. Next, a positive electrode terminal was fitted to the positive electrode.

<Formation of Negative Electrode>

Next, after a pulverized graphite powder was prepared as a negative-electrode active material, a negative electrode mixture was prepared by uniformly mixing 90 parts by mass of the above graphite powder and 10 parts by mass of poly(vinylidene fluoride) functioning as a binding agent, and this negative electrode mixture was further dispersed in N-methyl-2-pyrrolidone, so that a negative electrode mixture slurry was obtained.

Subsequently, the negative electrode mixture slurry thus obtained was applied to at least one of two surfaces of a negative electrode collector made of a copper foil having a thickness of 15 μm, followed by performing drying and compression molding using a roll press machine to form a negative-electrode active material layer, thereby forming a negative electrode. Next, a negative electrode terminal was fitted to the negative electrode.

<Separator>

As the separator, a uniaxial-stretched porous polyethylene film having a thickness of 7 μm was used.

<Formation of Winding Electrode Body>

A winding electrode body was formed by a method similar to that for the winding electrode body 20 shown in FIG. 3.

The winding electrode body 20 of the first example had the fixed portion 26 which was formed in such a way that the end edges 23E and 24E of the separators 23 and 24 were simultaneously processed by thermal cutting at 200° and were fixed together by heat sealing.

<Formation of Battery>

The winding electrode body 20 formed as described above was provided between exterior members, and three sides thereof were heat-sealed to form a bag shape. As the exterior member, an aluminum laminate film having humidity resistance was used which included a nylon film having a thickness of 20 μm, an aluminum foil having a thickness of 40 μm, and a polypropylene film having a thickness of 30 μm laminated to each other in that order from the outermost side.

Next, after 1.6 ml of a nonaqueous electrolytic solution was supplied into the bag formed as described above, the remaining one side thereof was heat-sealed under vacuum, so that sealing was performed. In this step, as the nonaqueous electrolytic solution, an electrolytic solution was used in which hexafluoro lithium phosphate was dissolved in a solvent containing ethylene carbonate and diethyl carbonate at a ratio of 4 to 6 on a mass basis, the ratio of the hexafluoro lithium phosphate to the solvent being 1.2 moles to 1 liter.

Accordingly, the nonaqueous electrolyte secondary battery (width: 34 mm, depth: 50 mm) of this example as shown in FIG. 2 was obtained.

Example 2

A nonaqueous electrolyte secondary battery was formed in a manner similar to that in Example 1 except that a winding electrode body having a structure similar to that shown in FIG. 4 was used.

The winding electrode body 20B of Example 2 had the fixed portion 27 formed by fixing the end edges 23E and 24E of the separators 23 and 24 using an isocyanate adhesive (manufactured under the trade name "Isocyanate-Based Wood Adhesive KR-302XT" by Koyo Sangyo Co., Ltd.).

Example 3

A nonaqueous electrolyte secondary battery was formed in a manner similar to that in Example 1 except that a winding electrode body having a structure similar to that shown in FIG. 5 was used.

The winding electrode body 20C of Example 3 had the fixed portion 28 formed by fixing the end edges 23E and 24E of the separators 23 and 24 using a two-sided adhesive tape (manufactured under the trade name "Polyimide Two-Sided Tape 4390" by Sumitomo 3M Limited) in which an adhesive was applied to two surface of a tape made of a polyimide resin.

Example 4

A nonaqueous electrolyte secondary battery was formed in a manner similar to that in Example 1 except that a winding electrode body having a structure similar to that shown in FIG. 6 was used.

The winding electrode body 20D of Example 4 had the fixed portion 29 formed by fixing the end edges 23E and 24E of the separators 23 and 24 using a one-sided adhesive tape (manufactured under the trade name "Polyimide Tape 5434" by Sumitomo 3M Limited) in which an adhesive was applied to one surface of a tape made of a polyimide resin.

Comparative Example 1

Figure 8:
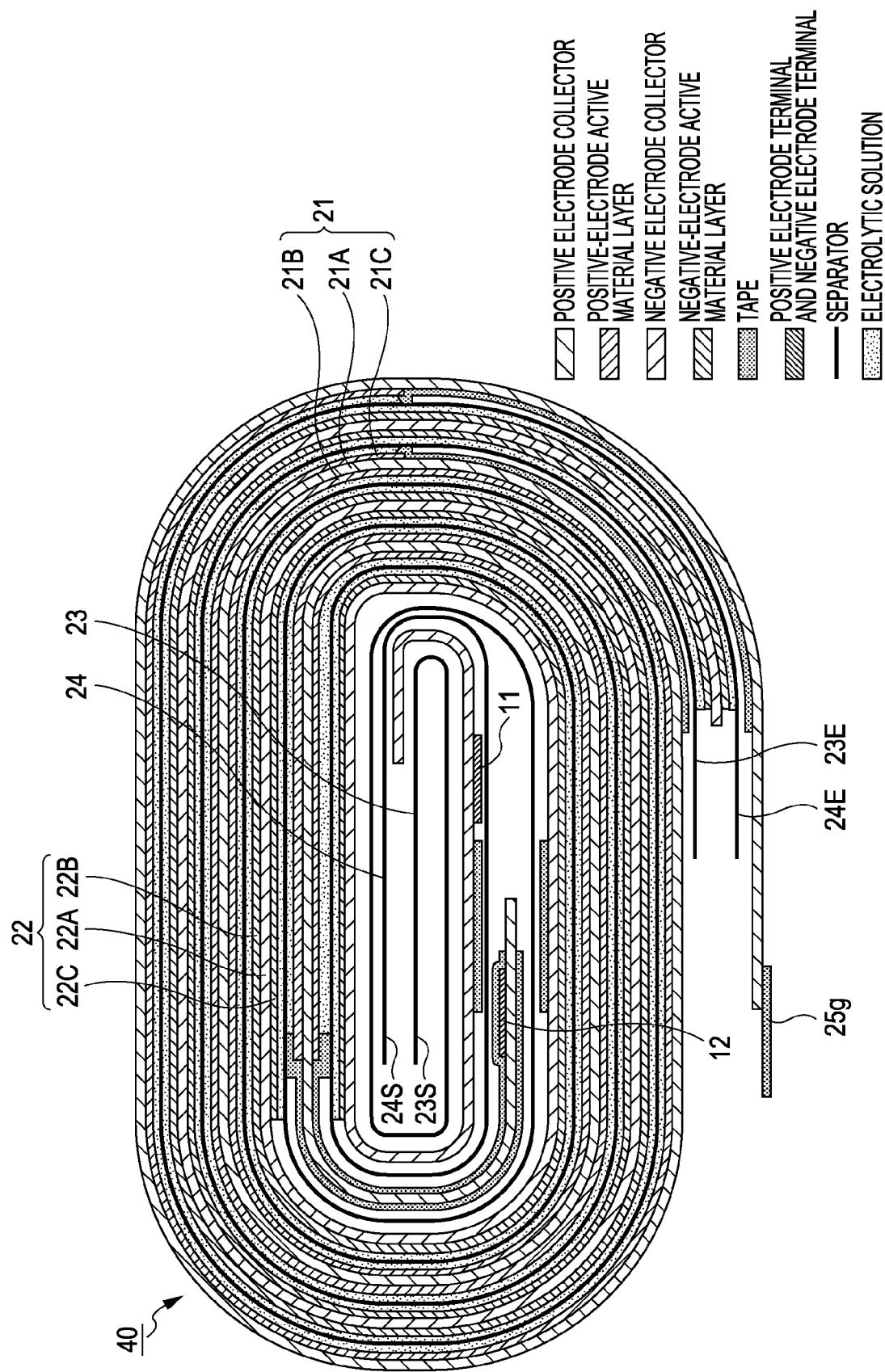
FIG. 8 is a schematic cross-sectional view showing a winding electrode body of Comparative Example 1.

A nonaqueous electrolyte secondary battery was formed in a manner similar to that in Example 1 except that a winding electrode body 40 shown in FIG. 8 was used.

FIG. 8 is a schematic cross-sectional view showing the winding electrode body of Comparative Example 1. In addition, in FIG. 8, constituent elements similar to those shown in FIG. 3 are designated by the same reference numerals.

In the winding electrode body 40 shown in FIG. 8, at the outer circumference side thereof, the end edges 23E and 24E of the separators 23 and 24 were not fixed to each other and were each placed in a free end state.

Comparative Example 2

Figure 9:
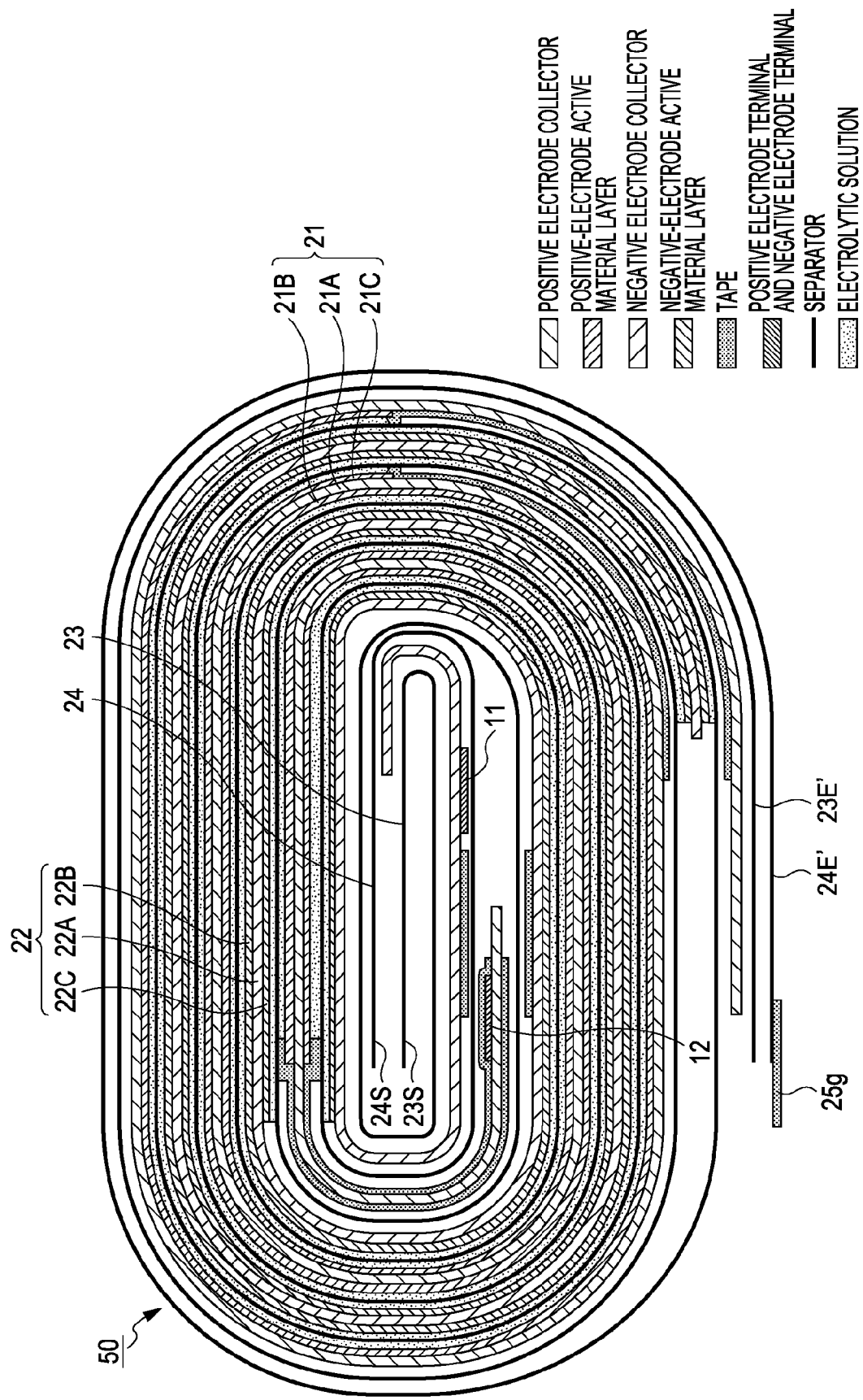
FIG. 9 is a schematic cross-sectional view showing a winding electrode body of Comparative Example 2.

A nonaqueous electrolyte secondary battery was formed in a manner similar to that in Example 1 except that a winding electrode body 50 shown in FIG. 9 was used.

FIG. 9 is a schematic cross-sectional view showing the winding electrode body of Comparative Example 2. In addition, in FIG. 9, constituent elements similar to those shown in FIG. 3 are designated by the same reference numerals.

In the winding electrode body 50 shown in FIG. 9, at the outer circumference side thereof, end edges 23E' and 24E' of the separators 23 and 24 were not fixed to each other and extended past the negative electrode 22 (negative electrode collector 22A). In addition, the end edges 23E' and 24E' were overlapped with each other and then were fixed by the protective tape 25g to a part of one separator which was already wound at the inner circumference side.

Comparative Example 3

A nonaqueous electrolyte secondary battery was formed in a manner similar to that in Example 1 except that a winding electrode body 60 shown in FIG. 10 was used.

FIG. 10 is a schematic cross-sectional view showing the winding electrode body of Comparative Example 3. In addition, in FIG. 10, constituent elements similar to those shown in FIG. 3 are designated by the same reference numerals.

In the winding electrode body 60 shown in FIG. 10, at the inner circumference side thereof, start edges 23S' and 24S' of the separators 23 and 24 were simultaneously processed by thermal cutting thereof and were fixed to each other by heat sealing, and at the outer circumference side, the end edges 23E and 24E of the two separators were simultaneously processed by thermal cutting thereof and were fixed to each other by heat sealing.

[Performance Evaluation]

The winding electrode bodies of Examples 1 to 4 and Comparative Examples 1 to 3 and the nonaqueous electrolyte secondary batteries using the above winding electrode bodies were evaluated as described below. For this evaluation, 50 winding electrode bodies and 50 nonaqueous electrolyte secondary batteries were measured for each Example. The results are shown in Table 1.

<Occurrence Rate of Short Circuit of Nonaqueous Electrolyte Secondary Battery>

For the nonaqueous electrolyte secondary batteries of each example, the ratio of the number of winding electrode bodies was calculated in which an internal short circuit occurred when a charged state was obtained by performing a constant-current constant-voltage charge of 1 C (600 mA) at an upper voltage limit of 4.2 V and at a temperature of 23° C. for 3 hours.

<Measurement of Cell Thickness of Nonaqueous Electrolyte Secondary Battery>

After a nonaqueous electrolyte secondary battery charged by the constant-current constant-voltage charge as described in the above occurrence rate of a short circuit was discharged to 3.0 V at a current of 0.2 C, a constant-current constant-voltage charge of 1 C was performed at an upper voltage limit of 4.2 V and at a temperature of 23° for 3 hours, so that the nonaqueous electrolyte secondary battery was placed in a charged state. After the battery in the charged state described above was provided between two parallel flat plates, the distance between the two flat plates was measured as the cell thickness.

<Heating Test of Nonaqueous Electrolyte Secondary Battery>

The nonaqueous electrolyte secondary battery in the charged state which was obtained in the thickness measurement was placed in an oven, was then heated to 150° C. at a temperature rise rate of 5° C./min, and was further held at 150° C. for 120 minutes. A nonaqueous electrolyte secondary battery which did not induce smoking and ignition was regarded as OK, and a nonaqueous electrolyte secondary battery which induced smoking and ignition was regarded as NG.

TABLE 1

|  | Occurrence Rate of Short Circuit | Cell Thickness | Result of Heating Test |
|---|---|---|---|
| Example 1 | 0% | 3.72 mm | OK |
| Example 2 | 0% | 3.72 mm | OK |
| Example 3 | 0% | 3.73 mm | OK |
| Example 4 | 0% | 3.74 mm | OK |
| Comparative Example 1 | 4% | 3.72 mm | Smoking |
| Comparative Example 2 | 0% | 3.77 mm | OK |
| Comparative Example 3 | 0% | 3.72 mm | Smoking |

It was confirmed that the winding electrode bodies of Examples 1 to 4 had a small cell thickness of 3.72 to 3.74 mm, and that the energy density could be improved. In addition, in the nonaqueous electrolyte secondary batteries of Examples 1 to 4, the occurrence of a short circuit was not confirmed during charging, and no thermal runaway (smoking and the like) occurred even by the heating test; hence, it was confirmed that high safety could be obtained.

On the other hand, in the nonaqueous electrolyte secondary battery of Comparative Example 1, the separator was lifted up at a winding end edge, and a short circuit occurred during charging. In addition, by the heating test, heat shrinkage of the separator occurred at the outer circumference side of the winding electrode body, and the positive electrode and the negative electrode were directly brought into contact with each other due to this heat shrinkage, so that smoking occurred.

In the nonaqueous electrolyte secondary battery of Comparative Example 2, the separator was not lifted up even by the heating test, and no internal short circuit occurred; however, since the end edges of the separators extended one turn or more and were wound around, the cell thickness was large, such as 3.77 mm, and the energy density was decreased.

In the nonaqueous electrolyte secondary battery of Comparative Example 3, since the start edges of the separators of the winding electrode body were fixed together and the end edges thereof were also fixed together to form a bag shape, when the separators heat-shrank in the heating test, electrodes were bent and deformed in the bag formed of the separators, and an internal short circuit occurred at the deformed portion, so that smoking occurred.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A winding electrode body comprising:
   a belt-shaped positive electrode;
   a belt-shaped negative electrode; and
   two belt-shaped separators,
   wherein the two separators are laminated with the positive electrode and the negative electrode are wound in a state that the positive electrode and the negative electrode are interleaved by the intermediate portions of the two separators in the longitudinal directions thereof,
   start edges of the two separators extending past the intermediate portions are disposed to face each other in a free edge state at a position at which the positive electrode and the negative electrode are not provided, and
   end edges of the two separators extending past the intermediate positions are disposed and fixed to each other at a position at which the positive electrode and the negative electrode are not provided.

2. The winding electrode body according to claim 1, wherein an end portion of the positive electrode or the negative electrode extends past the end edges of the two separators a half turn or more around the periphery of the winding electrode body.

3. A nonaqueous electrolyte secondary battery comprising:
   a winding electrode body which includes:
   a belt-shaped positive electrode;
   a belt-shaped negative electrode; and
   two belt-shaped separators,
   in which the two separators are laminated with the positive electrode and the negative electrode are wound in a state that the positive electrode and the negative electrode are interleaved by the intermediate portions of the two separators in the longitudinal directions thereof,
   start edges of the two separators extending past the intermediate portions are disposed to face each other in a free edge state at a position at which the positive electrode and the negative electrode are not provided, and
   end edges of the two separators extending past the intermediate positions are disposed and fixed to each other at a position at which the positive electrode and the negative electrode are not provided;
   a nonaqueous electrolytic solution; and
   an exterior package which accommodates the winding electrode body and the nonaqueous electrolytic solution.

4. A method for manufacturing a winding electrode body comprising:
   preparing a belt-shaped positive electrode, a belt-shaped negative electrode, and two belt-shaped separators;
   starting winding of the two separators while being disposed to face each other in a free end state without being provided with the positive electrode and the negative electrode;
   winding intermediate portions of the two separators in the longitudinal directions thereof together with the positive electrode and the negative electrode in the state that positive electrode and the negative electrode are interleaved by the intermediate portions of the two separators;
   while the positive electrode or the negative electrode is disposed between the two separators, with end edges of the two separators extending past the positive electrode or the negative electrode inbetween and facing each other;
   fixing the extending and facing end edges of the separators to each other;
   and
   fixing the positive electrode or the negative electrode which extends past the two separators to a portion which is already wound to complete the winding.

5. The winding electrode body according to claim 1, comprising a positive electrode terminal formed to extend to a top surface side of the winding electrode body in an axial direction.

6. The winding electrode body according to claim 1, comprising a negative electrode terminal formed to extend to a bottom surface side of the winding electrode body in an axial direction.

7. The winding electrode body according to claim 1,
wherein the positive electrode comprises a positive electrode collector and a positive electrode active material formed on at least one surface of the positive electrode collector, and
wherein an outermost end portion of the positive electrode collector extends past the end edges of the two separators that are fixed to each other.

8. The winding electrode body according to claim 7, wherein the outermost end portion of the positive electrode collector is fixed by a protective tape to a part of the positive electrode located at an inner circumference side of the winding electrode body.

\* \* \* \* \*